United States Patent [19]

Bell et al.

[11] 4,305,071

[45] Dec. 8, 1981

[54] TOUCH SENSITIVE SCREEN SIGNAL DETECTION ARRANGEMENT

[75] Inventors: Steve W. Bell, Eatontown; Robert L. Breeden, Middletown Township, Monmouth County; Michael J. Sabin, Aberdeen, all of N.J.

[73] Assignee: Bell Telephone Laboratories, Incorporated, Murray Hill, N.J.

[21] Appl. No.: 140,714

[22] Filed: Apr. 16, 1980

[51] Int. Cl.³ .................. G06F 3/153; G08C 21/00
[52] U.S. Cl. ...................... 340/712; 364/571; 364/582; 340/365 P; 307/358; 250/549
[58] Field of Search .......... 340/712, 365 P, 679, 340/680; 178/18; 250/549; 307/358; 364/571, 582

[56] References Cited

U.S. PATENT DOCUMENTS 3,348,234 10/1967 Foster ........................ 340/680 X
3,707,715 12/1972 Perotto ........................ 340/365 P
3,930,248 12/1975 Keller ........................ 340/680

*Primary Examiner*—David L. Trafton
*Attorney, Agent, or Firm*—David H. Tannenbaum

[57] ABSTRACT

In certain situations it is necessary to detect a slight change in a continuous wave signal and to be able to specifically determine the exact position of the change. This is especially necessary in situations where a continuously changing signal (with respect to time) is generated and where it is necessary to determine, at a particular instant of time, any change in the signal from a previous corresponding instant of time. Where the signal is periodic in nature and substantially repeatable between cycles it is possible to establish a memory data base of signal levels as a function of time. Comparisons can then be made on successive cycle against the known, or precalculated data base. Changes between the data base and the new signal result give a positive signal change indication.

9 Claims, 25 Drawing Figures

PHOTODIODE SIDE VIEW

HALF-POWER VIEWING AREA

VIEWING AREA WITH TOUCHPLATE ATTENUATION

TYPICAL PHOTODIODE PLACEMENT

TYPICAL INPUT SIGNAL-NO TOUCH

INPUT SIGNAL-WITH LIGHT TOUCH

PROCESSOR EFFECTIVELY "SEES" THIS SIGNAL
AFTER REJECTING COMMON MODE SIGNAL

INTHND

LOADPR

TCHDT

SAMPLE SPOT BOARD

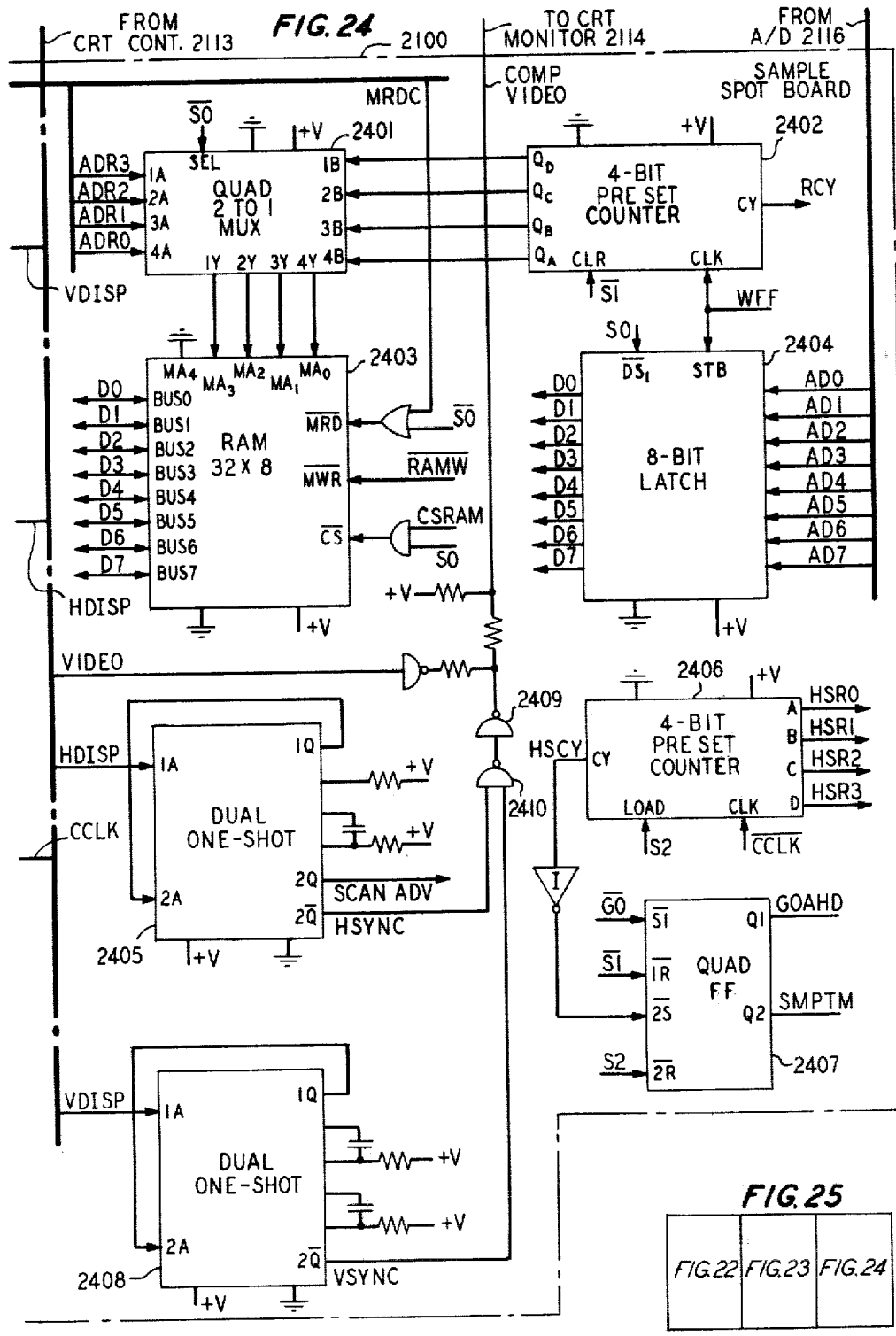

TOUCH SENSITIVE SCREEN SIGNAL DETECTION ARRANGEMENT

TECHNICAL FIELD

This invention is directed to situations where it is necessary to determine a change in a portion of a periodic signal. More particularly this invention is directed to a position determination system for use in a touch sensitive total internal reflective system.

BACKGROUND OF THE INVENTION

In concurrently filed patent applications of J. B. Mallos, Ser. No. 140,716 and L. R. Kasday, Ser. No. 140,715 both of which are hereby incorporated by reference herein, there are disclosed, inter alia, touch sensitive arrangements for determining the position of a finger touch on the surface of a CRT screen. In one embodiment there is disclosed a parallel surface device for overlaying the CRT screen through which light from the CRT screen may pass. When the screen is touched at a point on the device total internal reflection occurs and the light from the screen becomes trapped within the device. The trapped light travels to the edge of the device and is detected by photodetectors mounted along the edge. In another embodiment a flexible membrane is placed over the device. As long as an air gap remains between the top surface of the device and the membrane light from the screen will not become trapped within the device. Touching the membrane causes it to deflect into contact with the top surface of the device, thereby causing total internal reflection to occur. Since the reflection occurs at the instant the raster beam passes under the finger, the timing of its occurrence can be used to determine the position of the touch, as is done in light pen situations.

Problems stem, however, in the application of the above principles to a practical system. Imperfections in the surface of the screen, dirt, grease build-up, and geometrical aberrations all combine to cause some total internal reflection to occur at all times, even when no touch has occurred. The result is that the photodetectors produce appreciable output at all instants during which the raster beam is drawing bright areas on the screen.

These problems are compounded in that for each cycle of the raster the output wave form has a non-constant value resulting in a signal which, for a given point, may be greater in magnitude without a touch than is a subsequent portion of the signal output in the presence of a touch. Thus, it is not practical to simply measure the signal level of the photodiode output in order to detect a touch signal.

SUMMARY OF THE INVENTION

We have solved these problems by an arrangement, called the sample spot system, which is founded, in part, on the understanding that a meaningful touch can only occur at one of a set of specified touch locations according to the pattern formed on the face of the CRT screen. Taking advantage of this arrangement the screen is divided into nonpermanent locations designated touch areas and non-touch areas. The areas are completely flexible and may consist, at any point in time, as a single touch spot, or there may be several touch spots or areas spaced around the screen. The coordinate positions of the touch areas are stored in a memory and only signals generated while the raster is within the defined touch areas are considered by the sample spot system. The positions on the screen surface which are defined as touch positions are changeable from instant to instant and the limitation on the sum total of the surface area defined as touch area is limited only by the amount of memory incorporated in the system.

The sample spot system, during the times when the raster is within a defined touch area, samples the output from the photodiodes on a time defined basis. The values of the signal at each defined time position are stored in a memory. The sampling and storing is timed to the CRT raster beam so that drifts in the video image will cause no problems.

The sample spot system operates to sample the photodiode signal during all times that the raster beam passes through CRT locations which are within the defined touch regions. This sample is made for several successive raster cycles and the averaged result for each raster position is stored in a separate memory location. This occurs at a speed fast enough that it is assumed that all the samples are complete before the first touch could possibly occur. Thereafter, every time a frame is drawn on the CRT face by the raster at a rate of 60 frames per second the photodiode output corresponding to each touch area is sampled and the sample for each time is compared to the priorly stored untouched average sample for that time. When one of the compared samples exhibits an increase (mismatch) in magnitude over the priorly stored sample a touch signal is generated. Since the location of the mismatch in memory corresponds to a known position on the CRT screen the position of the touch on the screen is known exactly.

BRIEF DESCRIPTION OF THE DRAWING

These features and objects of our invention as well as others will be more fully appreciated from a review of the drawing in which:

FIGS. 22-24 show an implementation of the sample spot board; and

FIG. 25 shows how FIGS. 22-24 are arranged.

GENERAL DESCRIPTION

Figure 1:
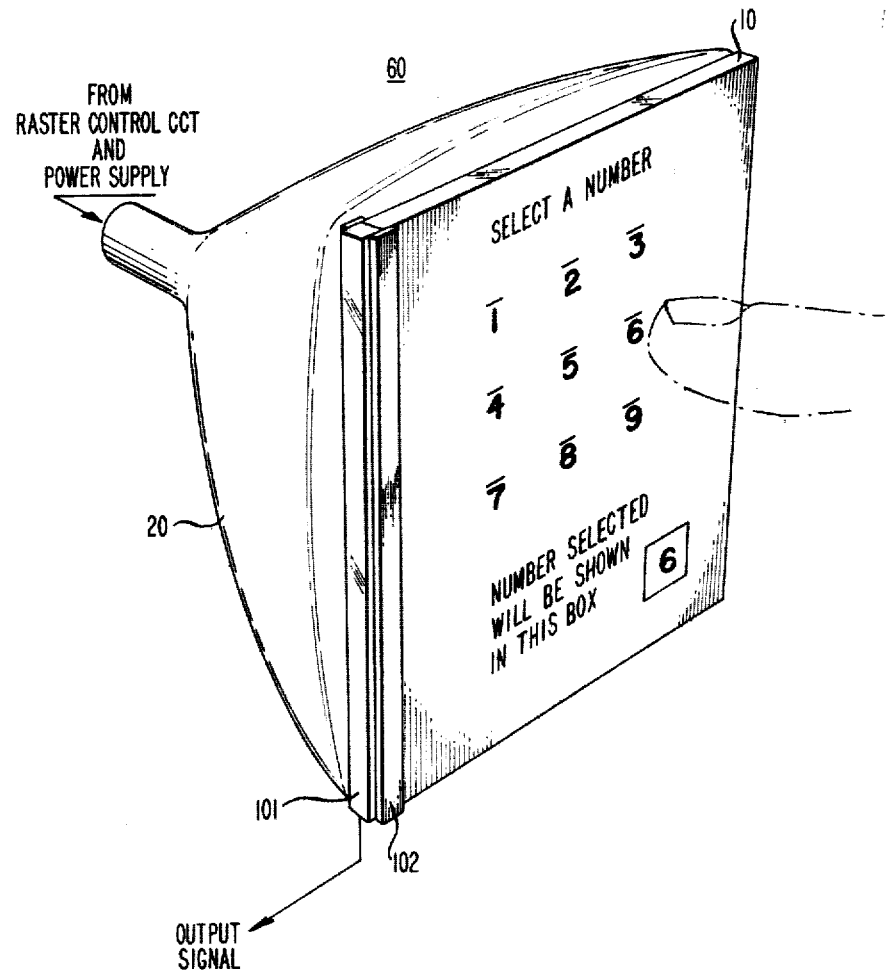
FIG. 1 shows a pictorial view of a CRT screen overlaid by our device.
Figure 2:
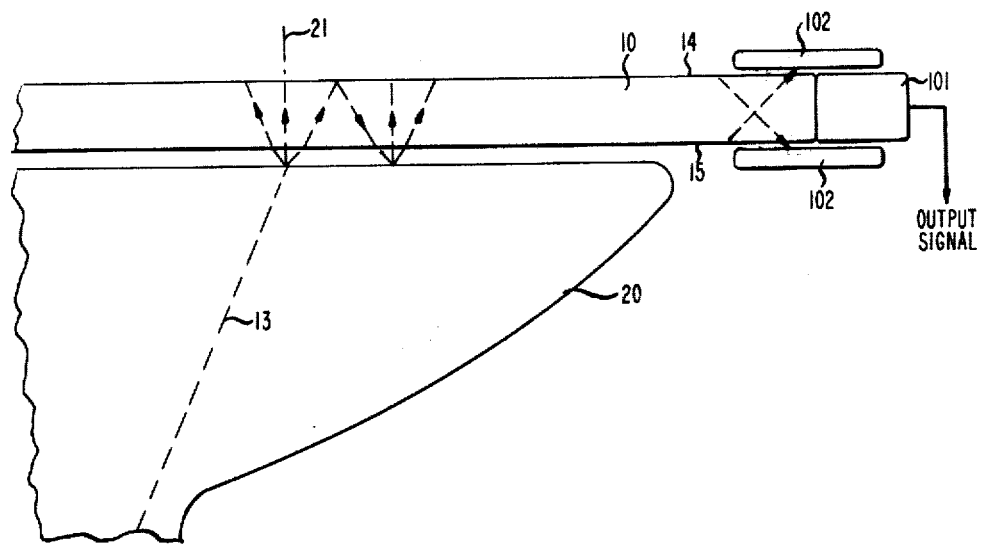
FIG. 2 is a schematic representation showing the device in the overlay, the overlay being in the relaxed position.
Figure 3:
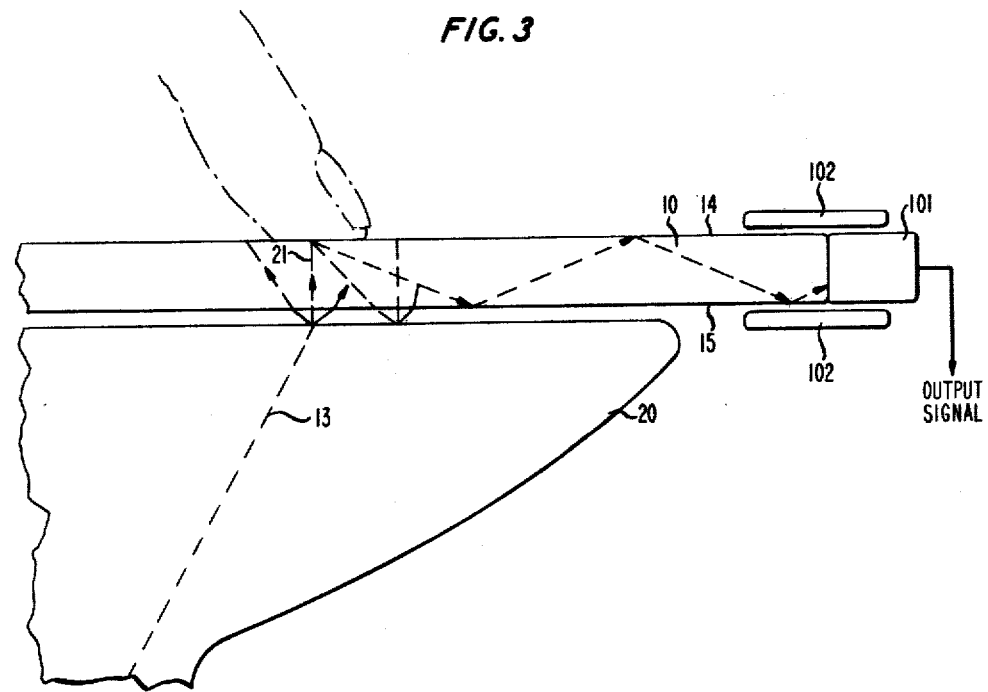
FIG. 3 shows our device with the membrane being deflected into contact with the top parallel surface.
Figure 4:
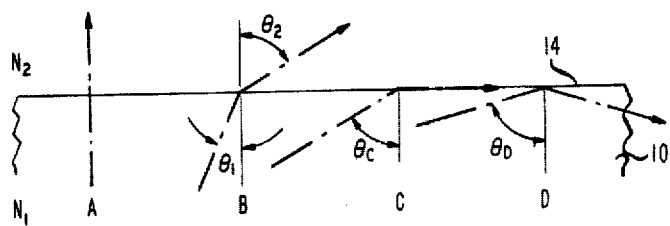
FIGS. 4 and 5 show the principles on which our invention is based.
Figure 5:
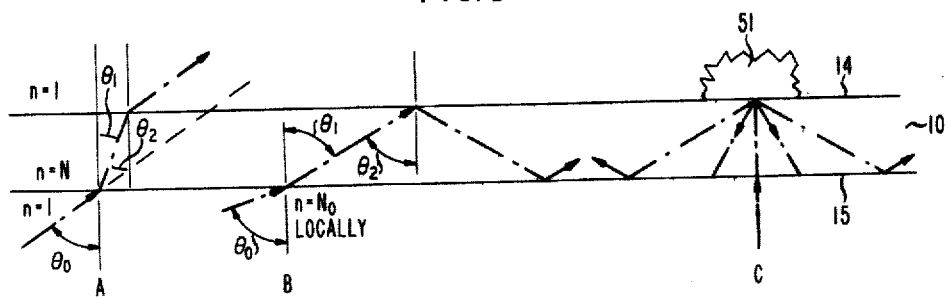

As shown in FIG. 1, CRT screen 20 is arranged in the well known manner such that electrons from the electron gun (not shown) impinge upon the phosphorescent screen of the CRT in a sequential pattern, line by line, from top to bottom. As the electrons hit the phosphorescent surface the surface glows. This phenomenon, of course, is now well known and forms the basis of television and other CRT systems.

By properly programming the system it is possible to have any type of image displayed at any position on the screen for any length of time. Thus, it is possible to create images representative of numbers, sets of numbers, letters, or signals in any position on the screen. Using this device, it is possible to allow a user to touch any position on the screen and to determine electronically the position of the touch. In order to accomplish this, the CRT screen is overlayed with device 10 having parallel surfaces through which light from the phosphorescent screen may pass. When the CRT screen projects an image calling for user response, a finger or other device is placed against the screen. When this occurs, as will be explained from that which follows, light becomes trapped within device 10. This trapped light travels to the edge of the device and is detected by photodiodes 101 thereby providing an output signal useable for determining the position of the touch. The actual determination of the touch position is accomplished by comparing the position of the CRT raster to the time of the output signal.

Figure 11:
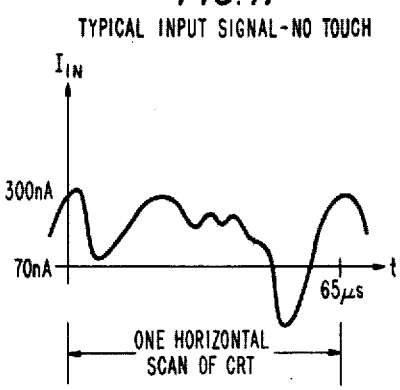
FIGS. 11-13 show the signal output from the photodetecting means.
Figure 12:
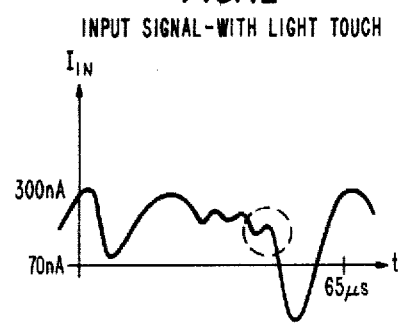
Figure 13:
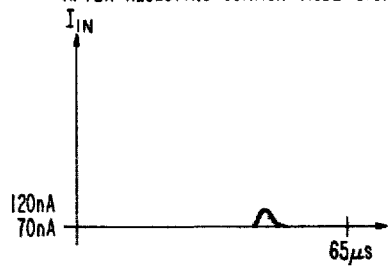

FIGS. 11 and 12 illustrate the problem in any attempt to detect a touch of the screen. As illustrated, in FIG. 11 the waveform is continuously varying with time and is repeatable for each cycle of raster scan. When a touch occurs, as shown by the circled portion of FIG. 12, a perturbation occurs on the waveform, but the instantaneous value of the changed signal is not necessarily larger than other values of the "non-touched" waveform. The desired result is shown in FIG. 13 and the arrangement for achieving such a result will be more fully discussed hereinafter. From FIG. 13 it is evident that once the perturbation has been isolated with respect to time it is possible to correlate the time to a raster position, thereby accomplishing the goal of position determination.

Our arrangement is to sample the raster on a line by line bases for several scan cycles thereby forming an average, or base line value, for each raster position. This can be accomplished since the raster position, both horizontally and vertically, is a function of time. Thus, taking the hypothetical screen shown in FIG. 14 and labeling the horizontal locations in a conventional manner the screen can be divided into arbitrarily defined positions. Thus, the raster would begin its scan at position X0, Y0 and end its scan for that line at position XN, Y0. The next scan would begin at position X0, Y1, and so forth for the entire screen.

Assuming that the positions (numbers 1-9) shown on FIG. 1 are the ones designated for possible touching at a particular time, then the positions shown in FIG. 14 could be established, as will be discussed. The output waveform from the photodiodes would be monitored at the time corresponding to those positions of the rasters to determine a changed condition from the averaged base line values of those positions.

DETAILED DESCRIPTION

Figure 6:
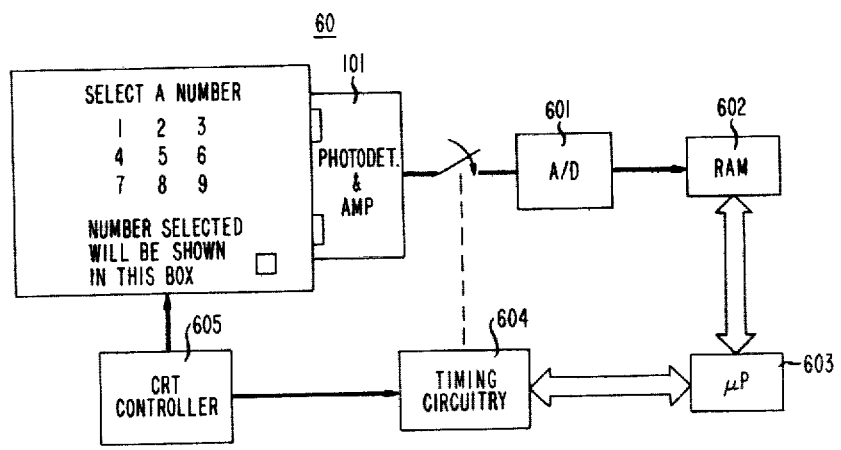
FIG. 6 shows a block diagram of an operational system.

FIG. 6 is a functional diagram of the detection system and will be discussed in detail hereinafter.

The scattered optical signal has a power per unit cross-sectional area $Q_O$ watts per square meter. This optical power strikes the photodetector active area, $A_O$ generating a photocurrent signal $I_O$. $I_O$ is processed by a low noise transresistance amplifier, with transfer function $Z(s)$ volts per nanoamp. The voltage at the amplifier output is sampled at a 1.5 MHz rate, for conversion into 6-bit digital format. Digital processing algorithms provide noise rejection and increased sensitivity to otherwise undetectable signals. The transfer function from the optical input to the voltage output (A/D input) is then given by:

$$(V_O/Q_O) = SA_O Z(s) \quad \text{Volts}/(\text{Watt/Square Meter})$$

where:
$V_O$ = Amplifier Output Voltage: (Volts)
$Q_O$ = Optical Input Power Density: Watts/(Square Meter)
S = Photodetector Responsivity: Nanoamp/Microwatt
$A_O$ = Photodetector Active Area: (Square Meters)
$Z(s)$ = Amplier Freq Domain Xfr Function: volts/-(Nanoamp/Unit Frequency)

Optical detectors 70 must respond uniformly to a wide dynamic range of light intensities, in order to detect the weak scattered signal in the presence of a wide range of room lighting and CRT display lighting intensities. A fast response time and low noise characteristic is required. For these reasons photodiodes are used to detect the optical signal. The devices used have a responsivity S = 600 nanoamps per microwatt optical power.

Figure 7:
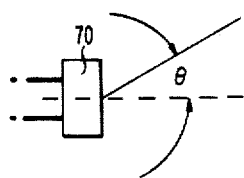
FIGS. 7-10 show the physical characteristics of the photodetecting arrangement.
Figure 8:
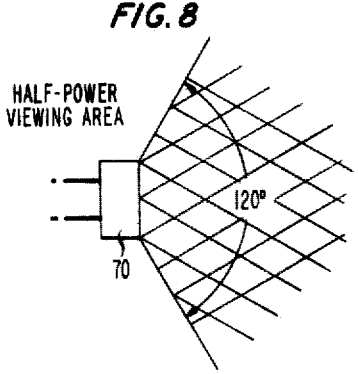
Figure 9:
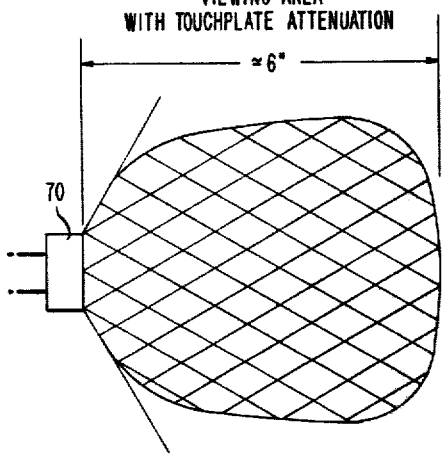
Figure 10:
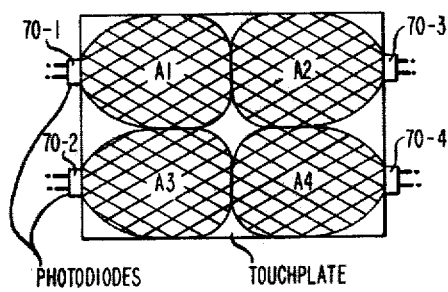

Consider a single photodiode, as shown in FIG. 7. The maximum sensitivity for the photodiode is for incident radiation that is normal to the plane surface of the photodiode active area. When the angle of incidence varies from the normal angle of incidence, the photodiode response decreases by a factor of the cosine of the incident angle. This gives the photodiode a half-power response area 120 degrees wide, as shown in FIG. 8. The photodiode response to a collimated light source anywhere within this area is a minimum of 50 percent of the response that would be measured from radiation which is normal to the active area. When the photodiode is mounted along the edge of a transparent touch plate and is used to detect trapped internally reflected light, additional optical attenuation mechanisms further restrict the viewing area of the photodiode. Some optical loss occurs when less than perfect internal reflection occurs at the touch plate - air interface. Also the translucent nature of the touch plate causes some attenuation as the light propagates through the plate. The measured half-power viewing area for an edge mounted photodiode, including the touch plate attenuation effects, is shown in FIG. 9. Eight photodiodes provide adequate optical coverage of a 12 inch display. The minimum scattered light intensity is 35 microwatts per square meter in the prototype system, (for a light touch, with a low display intensity) giving an input signal current of 50 nanoamps. With this level of signal, amplifier noise contributions are an important factor. To obtain good noise performance while providing adequate signal gain, a transresistance topology amplifier with FET input op-amp is used, the details of which are well known and not shown herein. The transresistance topology provides maximum gain stability and wideband frequency response for the high impedance capacitive source. This amplifier configuration, when driven with a high impedance source, is very insensitive to input-referred noise voltages, while it is very sensitive to input noise currents. For this reason an amplifier with an FET input stage is used, since the input noise currents are low (0.01pA per root hertz for the device used). The input noise voltage for this device is not particularly low, but the circuit is relatively insensitive to input noise voltages. Thus, this combination of amplifier circuit topology and FET input op-amp provides a low cost, low noise analog amplifier. The amplifier provides a very low impedance input node, ideal for the high impedance driving source. Input signals are in the range 50 to 500 nanoamps, so the amplifier gain required is $Z = 10^7$ volts per amp. The transresistance stage provides $10^5$ volts/amp of this gain and is followed by two noninverting voltage gain stages which provide a gain of 100 volts/volt. The 3 db bandwidth is 2 MHz; this is required to process the nearvideo bandwidth optical pulses which are scattered from a touch spot. The amplifier has a 100 KHz high-pass roll-off, to reject the strong low frequency noise due to photodiode 1/f (excess) noise and room lighting noise (e.g., fluorescent bulb firing noise). The 100 KHz high pass also differentiates the signal, canceling the integration effect of CRT phosphor persistence and finite light spot size (wide illumination area at the surface of the touch plate). (The integrating effects make it more difficult to obtain high touch spot resolution.) Noise and frequency response characteristics of the amplifier will be discussed hereinafter.

Stability of the analog amplifier is a particular problem in this design because of the video bandwidth and high gain requirements. A stability analysis lead to an amplifier design which is stable under all operating conditions.

A/D Conversion

The output of the final amplifier stage is sampled at a 1.5 MHz rate by a 6 bit A/D converter 601 (FIG. 6). The 1.5 MHz sampling rate gives one sample of the signal for each one tenth inch horizontal spacing across the CRT display area, assuming a 12 inch display. An RCA TCS-127 CMOS/SOS A/D performs the sample/hold and conversion function.

FIG. 6 illustrates the system which accomplishes the sample spot detection scheme. The touch plate is mounted on the screen of a Ball Miratel twelve inch video monitor. Photodiodes 60 are wired in parallel and drive an analog preprocessor cascaded by A/D converter 601. The digitized photodiode signal is routed to the sample spot hardware board which resides in an Intel SBC-905 card cage. It is the sample spot board shown in FIGS. 22-24 which perform the sampling of the photodiode waveform. The source of digitally generated video is a Soroc IQ-120 terminal. The Soroc provides synchronization signals to drive the timing circuitry of the sample spot board. The sample spot board also assembles a composite video signal to drive the Ball monitor. Also in the card cage is an Intel SBC-80/05 microcomputer, a one board computer centered about an Intel 8085 microprocessor. The 80/05 interfaces to the sample spot board to perform administration and computation duties.

Circuit Operation

The following is a description of the operation of the various digital circuits of the system.

SBC-80/05 Computer

The SBC-80/05 computer has 512 bytes of RAM, 4K bytes of EPROM, and an EIA level serial port. The 80/05 communicates with the sample spot board via a bus structure called the Multibus.

Soroc IQ-120 Terminal

Figure 15:
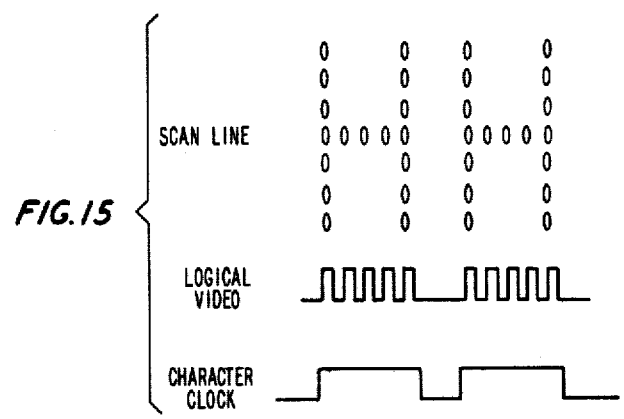
FIGS. 15 and 16 show various signal relationships.
Figure 16:
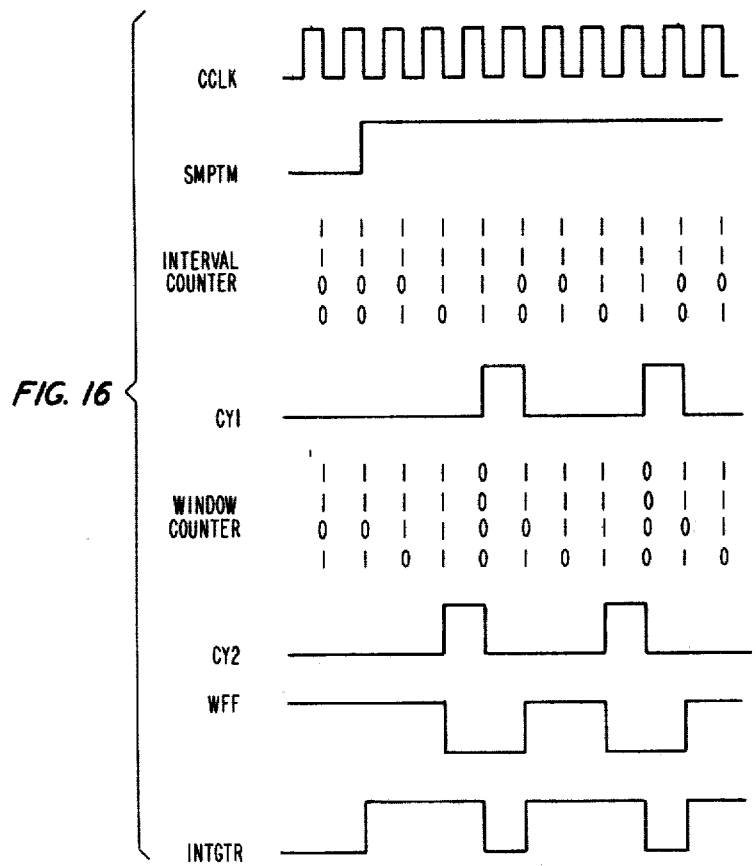

The Soroc terminal provides binary (TTL level) signals that are used by the sample spot board. FIG. 15 illustrates the video and character clock relationships for a typical scan line. FIG. 16 shows the active portion of the blanking signals.

Logical video: Denotes white or black for the video signal.

Character clock: Defines the time interval during which one character is displayed.

Horizontal blanking: Active during the blanked portion of the horizontal scan.

Vertical blanking: Active during the blanked portion of the vertical scan.

Sample Spot Board

Figure 21:
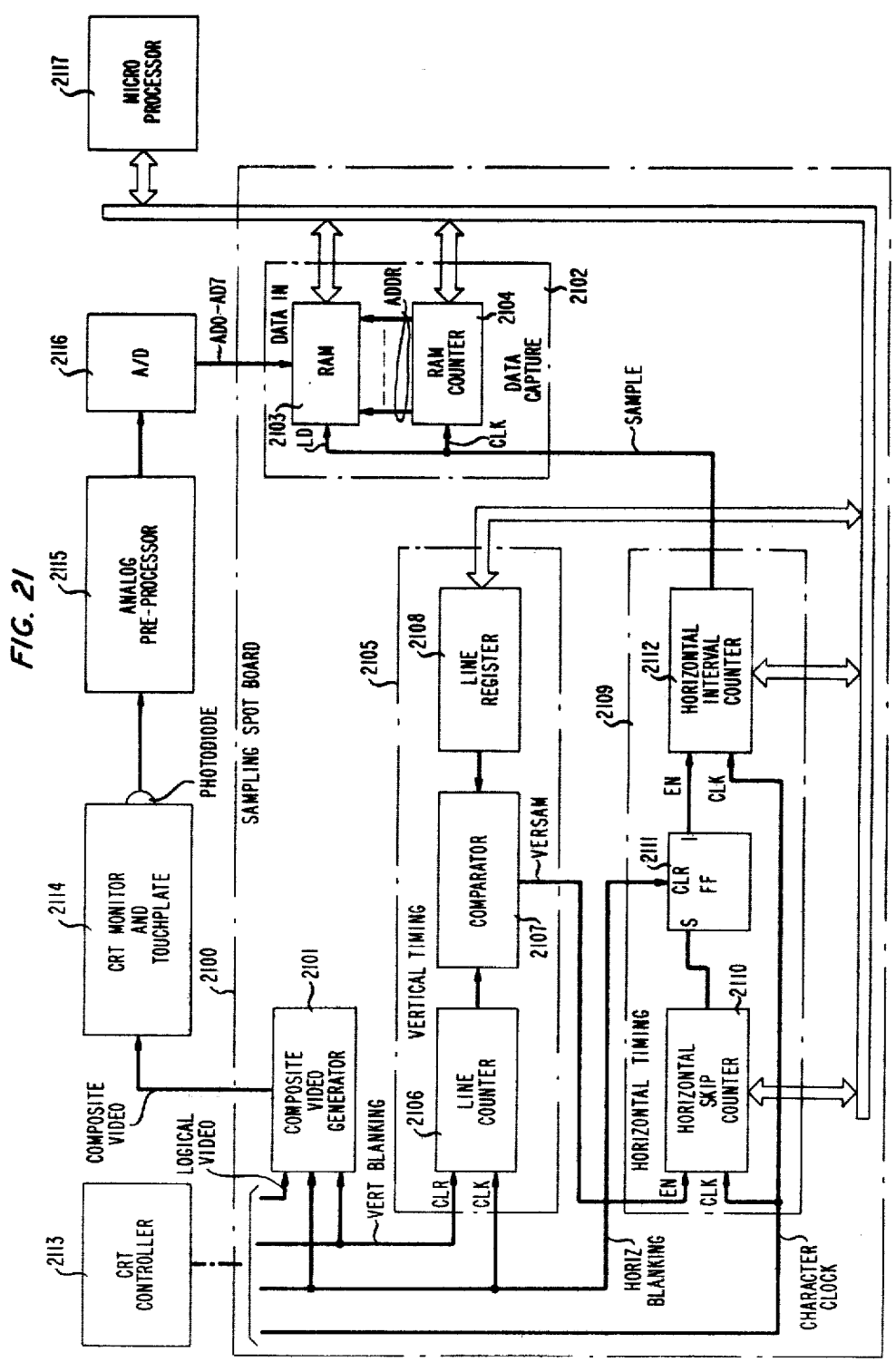
FIG. 21 shows a block diagram of the system.

FIG. 21 is a block diagram of the sample spot board 2100 and its interfaces to other system components.

Composite video generator 2101 assembles the composite video signal which drives the Ball monitor. Data capture circuit 2102 captures sampled, digitized photodiode data during one raster scan line. This circuit includes RAM 2103 which stores the sampled data. The RAM loading is performed without processor intervention when the timing circuitry generates the SAMPLE signal. The RAM contents are subsequently read by the processor. Data capture circuit 2102 also includes RAM counter 2104 which causes data to be stored sequentially by incrementing the RAM address after each storage. The counter is set to zero by the processor prior to the sampling of a raster line.

Timing circuitry 2105 and 2109 generates the SAMPLE signal, causing capture of sample data during the programmed scanned line. Capture begins at some programmed character positions on the line and occurs at uniformly spaced positions. The spacing between these positions is also a programmed value. Vertical timing 2105 causes capture to occur during the desired raster line, the value of which is loaded by the processor into line register 2108. Line counter 2106 indicates the current line of the raster scan. The line counter is cleared by the vertical blanking signal and incremented by the horizontal blanking signal. When the line counter is equal to the value in the line register, the signal VERSAM is activated by comparator 2107, enabling horizontal timing circuitry 2109 which generates the SAMPLE signal at the appropriate character positions. Horizontal skip counter 2110 and interval counter 2112 are each programmed by the processor to count from zero up to a specified value. Once enabled by the VERSAM signal, the horizontal skip counter counts character positions until it reaches its preset value and then sets flip-flop 2111 which enables the interval counter. The interval counter counts the specified number of character positions, resets to zero, and continues counting. When the counter is first enabled and each time thereafter that it goes to zero, the SAMPLE signal is activated, causing loading of RAM 2103 and incrementing of RAM counter 2104. When the current raster scan is completed, the horizontal blanking pulse from CRT controller 2113 resets the flip-flop, disabling further data capture.

Frame Data Capture and Processing

Figure 14:
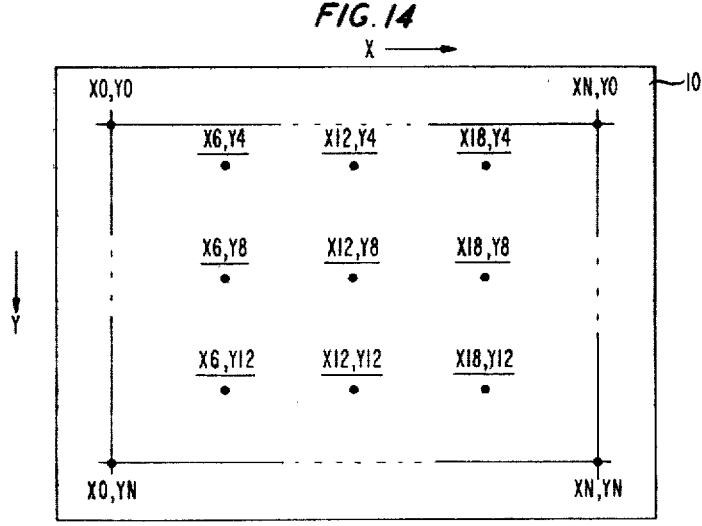
FIG. 14 shows the ordinate position of a CRT screen.
Figure 17:
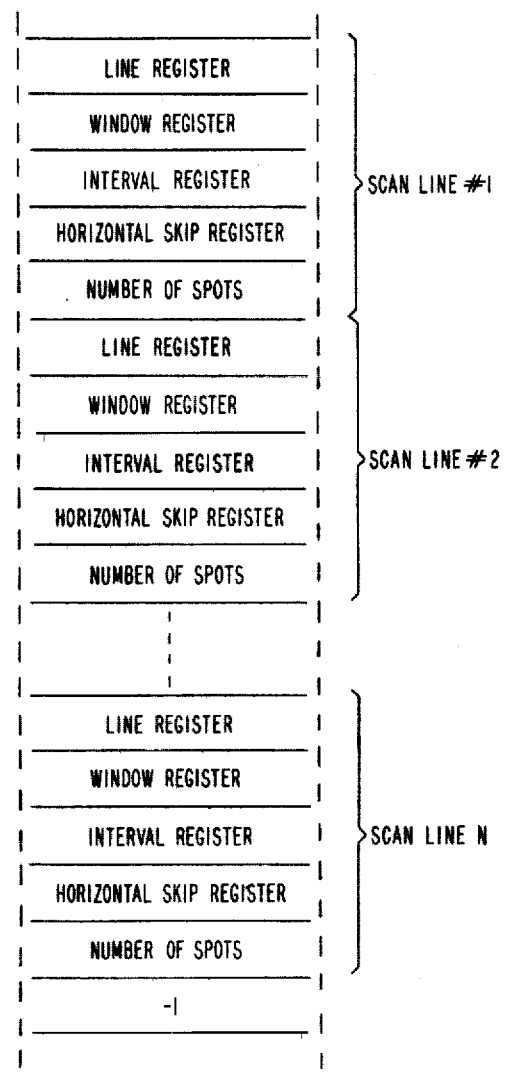
FIG. 17 shows the memory register organization.

Referring to FIGS. 14, 17 and 21, capture of sampled photodiode data for all touch spots of a given display pattern is performed row by row from the top of the display to the bottom. Processor 2117 programs the sample spot board to capture data for the first row of touch spots (for example row Y4, FIG. 14). After this data is stored in the sample spot RAM, it is read and stored by the processor. The sample spot board is then programmed to sample the next row of touch spots (Row Y8, FIG. 14) and this data is read by the processor. The procedure is repeated until all rows of touch locations have been sampled and stored. Thus, each row that is sampled gives an output signal similar to that shown in FIG. 11. This signal is further broken into segments, each segment being a horizontal position.

The processor stores the data sequentially in the order it is sampled. The resultant array is called a data frame because its elements represent the values of the photodiode output at each touch spot during one frame time of the video signal. This sequence is shown in FIG. 17.

Processing of the data is performed asynchronously with respect to the capture procedure. This allows the processor to utilize the time during which the sample spot hardware is waiting for the raster to reach the programmed line. Usually a row of touch spot data is completely processed before the raster reaches the next row of spots. The net result is that the entire display of touch spots can be sampled and processed during one frame time (16.7 msec.) of the video signal.

Touch Detect Algorithm

Figure 18:
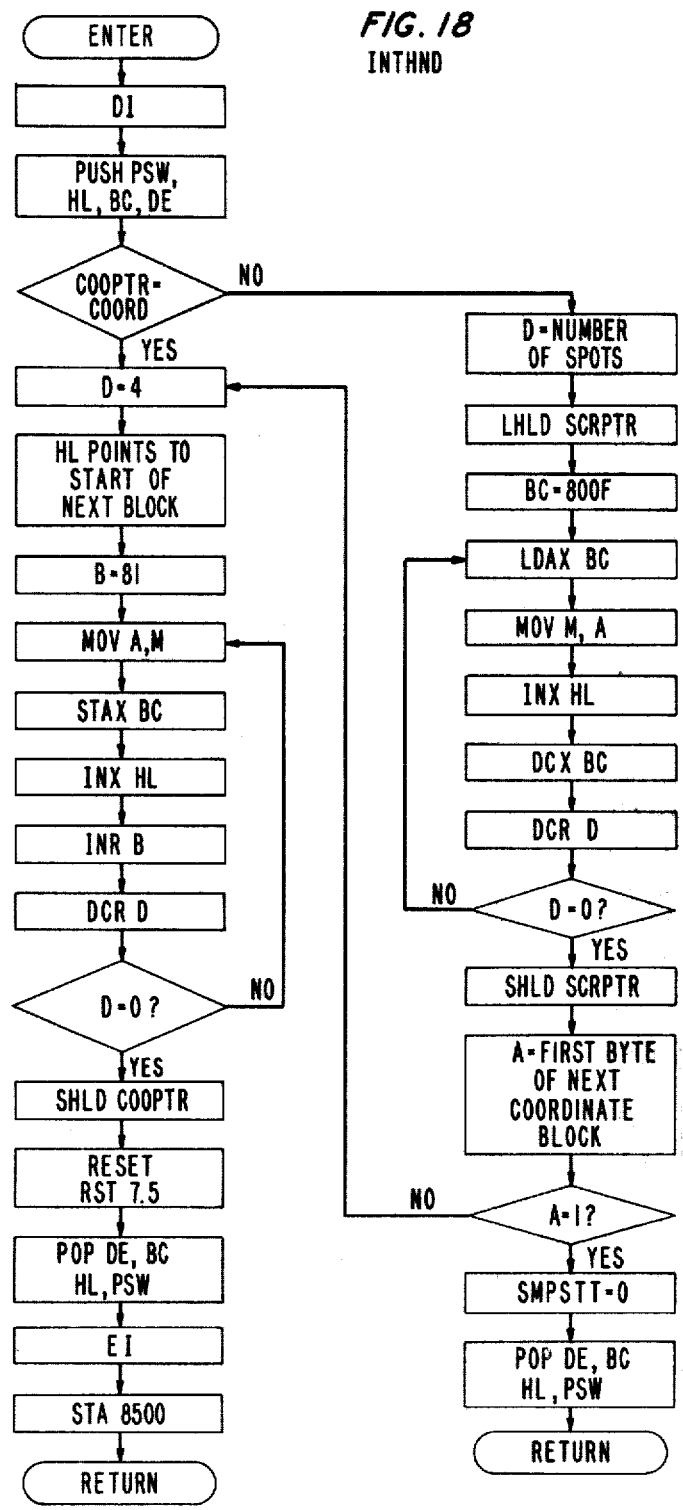
FIGS. 18-20 show the flowchart of the operation of the system.
Figure 19:
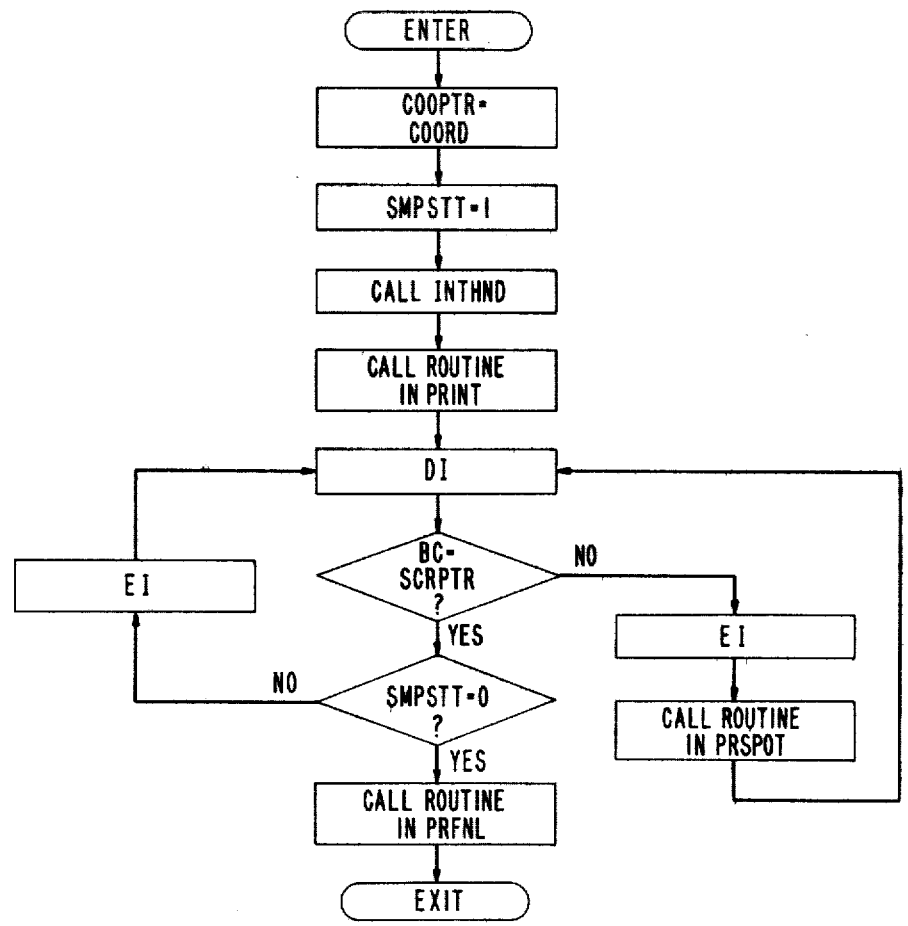
Figure 20:
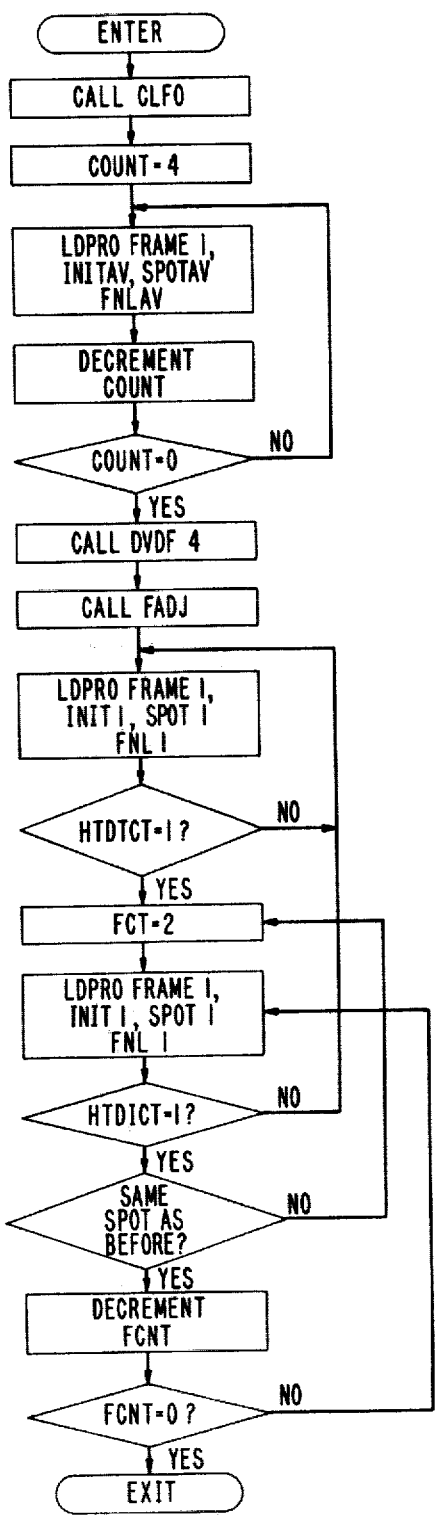

FIGS. 18, 19 and 20 illustrate the algorithm for touch detection. During the first four frame times of the video signal (67 msec.) it is assumed that no touch has yet occured. The four data frames are captured and corresponding elements are averaged together. The result is an array whose elements represent the average photodiode output at each touch location during the four video frames. This array is called the reference or base frame.

Successive frames of data are captured. As a frame is captured, each element is compared to the corresponding element in the reference frame. The element with the largest increase over its reference value becomes a candidate for a touch decision if the increase is above a fixed threshold. When three successive frames yield the same touch candidate, a decision is made that a touch has occurred at the corresponding touch spot.

Figure 22:
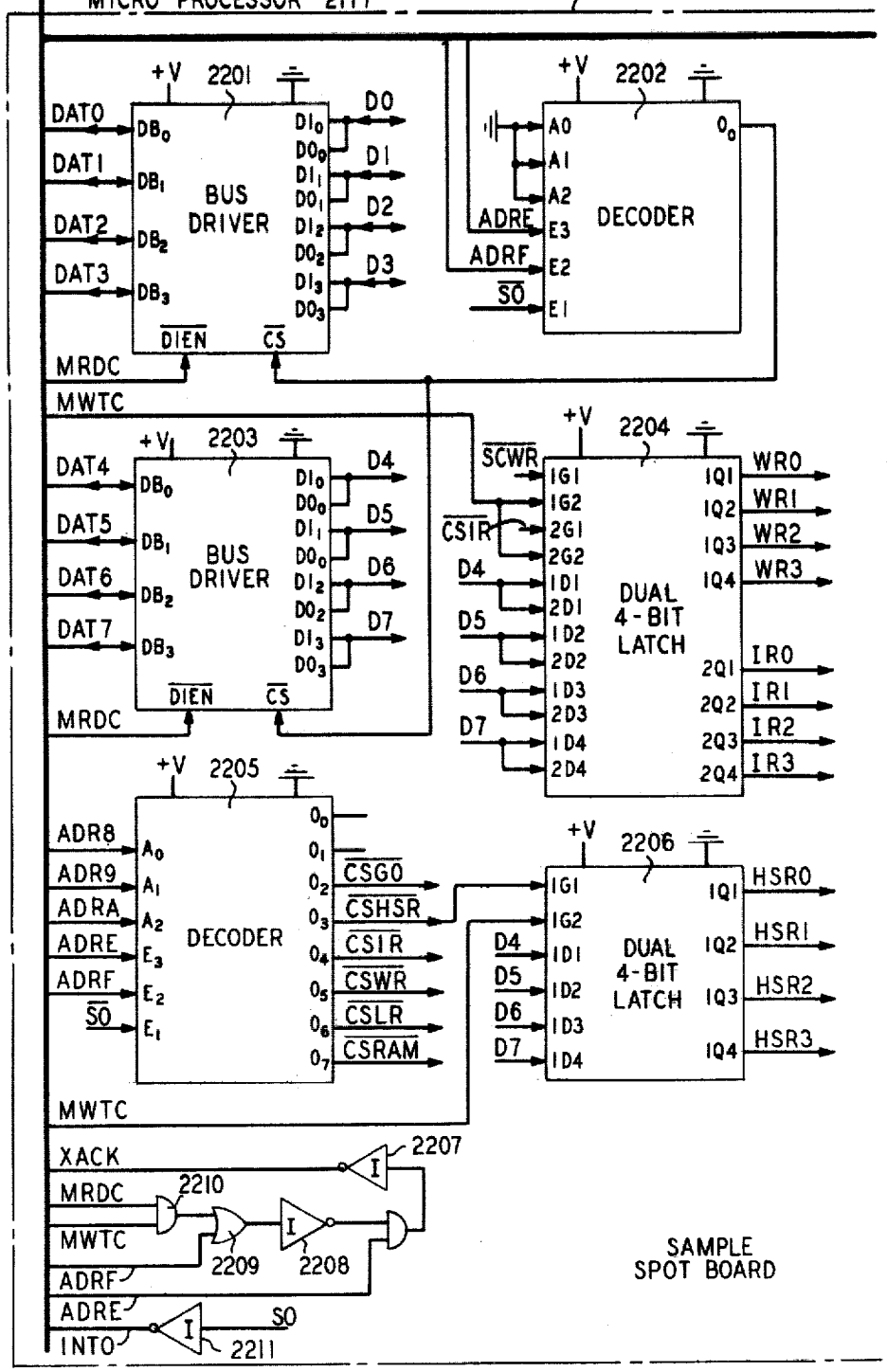
Figure 23:
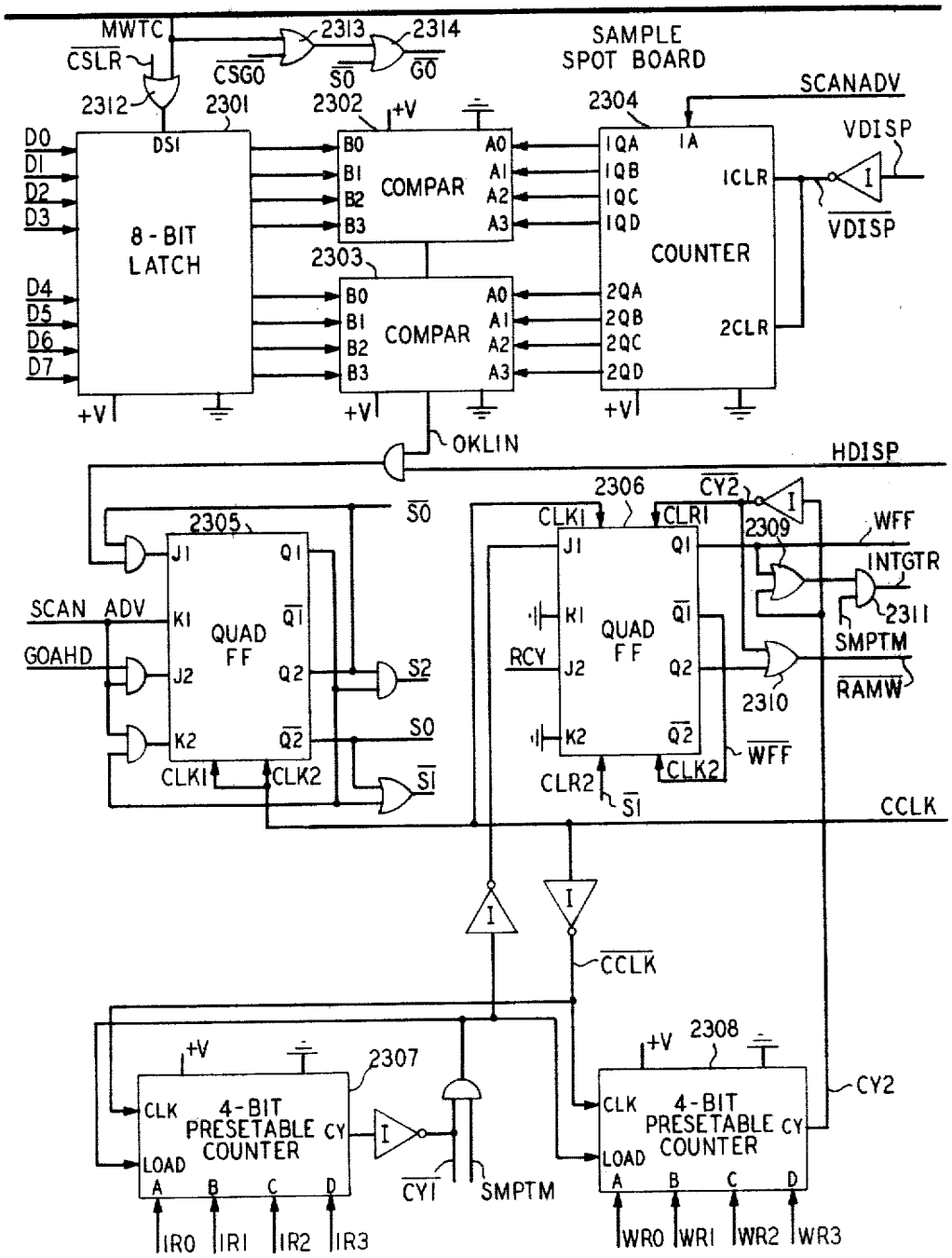

The following signals and memory locations must be established. These are shown in FIGS. 22-24.

Soroc IQ-120 Terminal

The Soroc terminal provides several signals which are used by the sample spot board.

VIDEO: The logical video signal.

CCLK: The character clock signal. It serves as the master clock for the sample spot board as well as the conversion clock for the A/D converter. (A/D sampling of the digitized photodiode signal occurs on the leading edge of CCLK.)

HDISP: The logical complement of the horizontal blanking signal. HDISP is high during the active portion of the horizontal scan.

VDISP: The logical complement of the vertical blanking signal. VDISP is high during the active portion of the vertical scan.

A/D Converter Output

Signals AD0 to AD7 (FIG. 24) are the output data bits of the A/D converter. Although the sample spot board provides for up to eight bit quantization, the A/D converter used in the preprocessor performs six bit quantization, since only six bits are required to provide adequate dynamic range.

Composite Video Output

Signal COMPVIDEO is the composite video output which drives the Ball monitor.

Multibus Signals

The Multibus provides the means for communication between the 80/05 and the sample spot board. Complete specifications for the Multibus can be found in the appropriate application notes for the intel 80/05, while the 80/05 reference manual specifies the timing requirements particular to the 80/05.

The sample spot board uses a subset of the Multibus signals for its communication with the 80/05. These signals (all active low) are described here.

DAT0/-DAT7/: Eight bit data bus. Data is supplied by the 80/05 for a write operation or by the sample spot board for a read operation.

ADR0/=ADRF/: Sixteen bit address bus. The address is always supplied by the 80/05 to specify the sample spot board location to be accessed.

MRDC/: Instructs sample spot board to perform a read operation.

MWTC/: Instructs sample spot board to perform a write operation.

XACK/: Provided by sample spot board to acknowledge completion of read or write operation.

BPRN/: Informs the 80/05 that no other board is requesting mastership of the Multibus. This signal is tied to ground at the 80/05 by means of a jumper on the card cage backplane.

INT0/: An interrupt line to the 80/05. The 80/05 is configured such that the INT0/ signal is inverted and then applied to the RST 7.5 pin of the 8085 microprocessor. As such, the 80/05 can be interrupted on a falling edge of INT0/.

Multibus signals are brought to the sample spot board through connector P1.

Sample Spot Hardware

Composite Video Generator

Dual one-shot 2405 (FIG. 24) is used to generate the horizontal sync pulse. When HDISP goes low, indicating the start of horizontal blanking, the first one-shot provides a delay which is used to horizontally center the display on the Ball monitor. After this delay, the second one-shot is fired, providing the negative going horizontal sync pulse HSYNC. The complement of HSYNC is used as the SCANADV signal described later.

Dual one-shot 2408 is used in a similar way to generate the negative going vertical sync pulse VSYNC. Again, the first one-shot provides a delay for vertical centering and the second one-shot generates the sync pulse.

Quad open collector NAND gate array, 2409, 2410, assembles the components into the composite signal. The resistive voltage divider provides the three levels of output, corresponding to white, black, and sync. Output imedance is approximately 75 ohms.

State Controller

Operation of the sample spot board is divided into three phases which are controlled by a triple state Moore machine.

State S0 is the only state in which the processor can communicate with the sample spot hardware. The sampling process is dormant and communication paths are available. During S0 the processor can read the contents of the sample spot RAM, which contains data from the most recent raster line sampled. The processor also programs the various registers to specify the parameters for the next sampling. To exit S0 and initiate sampling, the processor sets the GOAHD latch (described later). Transition to state S1 then takes place at the next occurrence of SCANADV, i.e., at the end of the current raster display line.

State S1 is an intermediate state in which the hardware waits until the raster is at the active scan portion of the line specified in the line register. During S1 the GOAHD latch is reset and the sample spot RAM address counter is set to zero. S1 is exited after OKLIN is activated (described later), indicating that the specified raster line has begun. Transition to state S2 then occurs when HDISP goes high.

State S2 is the state during which capture of data takes place. The horizontal timing circuitry is activated and storage of data in the RAM occurs. SCANADV signals the end of the prescribed raster line and is thus used to cause transition back to state S0.

The hardware for the triple state machine consists of dual JK flip-flop 2305 and associated gates.

Address Decoding

Decoder 2205 provides decoding of the Multibus address lines by activating the appropriate device select signal. All device select outputs of 2205 are inactive when the hardware is not in state S0.

Bidirectional Bus Drivers

Bus drivers 2201, 2203 are bidirectional bus drivers that interface the Multibus data lines (DAT0/ to DAT7/) to the data bus of the sample spot board (D0 to D7). Decoder 2202 provides enabling logic for the drivers. Whenever the sample spot hardware is not in state S0, the drivers are not selected so that D0 to D7 are isolated from DAT0/ to DAT7/. Otherwise, enabling of the drivers occurs according to the two upper bits of the address lines, ADRF/ and ADRE/. The drivers are directed according to the state of the read signal, MRDC.

Timing Circuitry

Vertical Timing

Eight-bit latch 2301 serves as the line register. It is loaded by the processor through a standard memory write operation. Eight-bit counter 2304 is incremented at the end of each raster line by the SCANADV signal and is set to zero during vertical retrace by the VDISP signal. Eight-bit comparator 2302-2303 activates the signal OKLIN whenever the line counter and line register are of equal value.

Horizontal Timing

Dual 4-bit latch 2206 and 4-bit preset counter 2406 form the four bit programmable horizontal skip counter. One of the two latches is used as the horizontal skip register and is loaded by the processor with the one's complement of the number of characters of skip before sampling. When state S2 is entered, four bit presettable counter 2406 begins to count characters at the preset value and continues until it reaches the value 1111. At this time it sets latch signal SMPTM on quad FF 2407 which enables the interval counter. (SMPTM is reset when S2 is exited).

Dual 4-bit latch 2204 and 4-bit presettable converter 2307 form the 4-bit programmable interval counter. Part of dual 4-bit latch 2204 is used as the interval register. It is loaded by the processor with the two's complement of the sampling interval size in characters. When SMPTM is activated 4-bit presettable counter 2307 counts characters until it reaches 1111. It then resets (on the next character) to the value loaded in the interval register and continues counting. The cycle repeats as long as SMPTM is active.

In addition to the horizontal skip and interval counters, there is another programmable counter called the window counter formed by elements 2204 and 2308. It is used to generate a window for controlling an "integrate and dump" analog processor in the event that such processing is desired. One of the 4-bit latches of 2304 serves as the window register. 2304 counts simultaneously with the interval counter 2307 but presets to the value in the window register. By loading the window register with a value greater than that of the interval register, the window counter will count past 1111 to 0000, etc., until it is preset when the interval counter is preset.

The carry outputs of 2307 and 2308 are combined by 2306, 2309, 2310, 2311 to produce signals (FIG. 16) used for various purposes to control the sampling process. The use of each signal will be discussed in subsequent sections.

Data Capture Circuitry (Refer to the waveforms in FIG. 16).

Eight bit latch 2404 holds the data from the A/D converter for loading into the RAM. The data is latched on the falling edge of WFF and held as long as WFF is low. When the hardware is in state S0, the outputs of 2404 are high impedance so as to not effect the data bus D0 to D7.

RAM 2403 is a 32 by 8 RAM that stores the sampled data. During states S1 and S2, the chip select is always active while the read signal is always inactive. This allows the hardware to write into the RAM directly. Neglecting for the moment the effect of 2306 and 2310, it is CY2 that is the write pulse for the RAM. The leading edge of CY2 coincides with the falling edge of WFF so that the data is held constant by 2404 for (and beyond) the duration of the write pulse. Also during states S1 and S2, two to one multiplexer 2401 connects the address lines of the RAM to the output of the RAM counter 2402. This counter is cleared at state S1 and incremented on the falling edge of WFF so that the address is advanced after the write operation is completed.

Since RAM counter 2402 is only four bits wide, precautions must be taken to ensure that not more than sixteen samplings are captured on a given raster line. The combination of 2306 and 2310 serves this purpose. When 2402 reaches a count of 1111, the RCY flag goes high. This causes the Q2 output of 2306 to go high on the next rising edge of WFF, i.e., when the count of 2402 goes to 0000. OR gate 2310 then blocks the write pulse CY2 so that no more data can be stored, preserving the previously written contents. The Q2 output of 2306 is cleared during state S1, coincident with the resetting of the RAM counter.

During state S0, 2401 connects the address lines of the RAM to the Multibus address lines ADR0/ to ADR3/. Because the Multibus signals are active low, address space locations of the RAM contents are in reverse order to what would otherwise be expected. This characteristic is observed in the address space assignments of Table 3.

GOAHD Circuitry

FF 2407 contains the GOAHD latch. When a write operation is performed in state S0 to the appropriate memory location, two gates 2313, 2314 activate the GO signal, which sets the GOAHD latch. When state S1 is entered the latch is cleared.

XACK/ Circuitry

Elements 2210, 2209, 2208, 2207 gate the read and write commands to produce the XACK/ signal. The XACK/signal is activated for the duration of any read or write command that occurs when the address on the Multibus is in the range of 8000 to BFFF. The 690 nanosecond length of the read and write commands allows ample time to complete the transfer before the end of the command.

Interrupt Driver

Element 2211 pulls INT0 low whenever the hardware is in state S0. In view of the interrupt configuration of the 80/05 this means that the RST 7.5 pin of the 8085 is high whenever the sample spot board is in state S0. Since RST 7.5 is a rising edge triggered interrupt, the 80/05 can be interrupted whenever the sample spot hardware makes a transition into state S0, i.e., when the sample spot board is finished sampling a line.

Frame Sampling

Coordinate Block Data Structure

The locations of the touch spots to be sampled are specified by means of a blocked data structure as illustrated in FIG. 14. The structure begins at location COORD. Each raster scan line to be sampled is described by a block of five bytes. The upper nibble of each of the first four bytes contains the four bit quantity that is to be loaded into the appropriate sample spot register as listed in FIG. 7. The fifth byte is an integer that specifies the number of touch spots on the line. Blocks are concatenated in the order in which the corresponding raster lines are to be sampled. The end of the structure is denoted by a byte containing −1 placed after the last block.

Interrupt Handler

Background

Administration of the data capture process and construction of the frame array is performed by the interrupt handler routine INTHND. INTHND is entered at location 3C, the branch vector for the RST 7.5 interrupt of the 8085.

INTHND is entered by one of two means. The application program initiates from sampling by calling INTHND as a subroutine. Thereafter, INTHND is entered when the RST 7.5 interrupt occurs, indicating that sampling of one scan line is completed. Both mechanisms enter at location 3C; INTHND is able to distinguish between the two types.

Several flags and pointers are used by INTHND to communicate with other routines.

SMPSTT: An eight bit quantity that indicates whether or not sampling of a frame is in progress. It is set to 1 (sampling in progress) by the calling routine and cleared (sampling done) by INTHND when all frame data has been captured.

COOPTR: A sixteen bit quantity that points to the block corresponding to the current scan line being sampled. It is initialized by the calling routine to contain the address COORD and updated by INTHND as each line is sampled.

SCRPTR: A sixteen bit quantity that points to the next location in processor RAM that is to be loaded with sampled data. It is initialized by the calling routine and updated by INTHND as data is captured.

Upon entry, INTHND disables interrupts and saves the processor registers on the stack. It then determines the method of entry by comparing the value of COOPTR to COORD. Equality indicates that INTHND has been called as a subroutine for the purpose of initiating frame sampling; inequality indicates that INTHND is responding to an RST 7.5 interrupt signaling that sampling of a raster line is completed.

In the case of inequality, it is first necessary to transfer the captured data from the sample spot board to the processor RAM. Register D is used as a down counter and is initialized to the number of touch spots on the sampled raster line. Register pair HL serves as a pointer to processor RAM. It is initialized to the value of SCRPTR and incremented as data is stored. Register pair BC points to the sample spot RAM. It is initialized to 800F and decremented as data is stored. After all the data has been transferred, SCRPTR is updated to the next available location in processor RAM. The first byte of the next coordinate block is checked for the −1 byte that indicates the end of frame sampling. If sampling is over, the SMPSTT flag is cleared, processor registers are restored, and INTHND is exited.

If sampling is not yet complete, INTHND proceeds in the same way it does as if it had been called to initiate frame sampling and programs the hardware for sampling the next desired raster line. Register D is used as a down counter and is initialized to 4. Register pair HL points to the first byte in the coordinate block and is incremented as each register is loaded. Register B contains the upper byte of the sample spot register address and is also incremented. After the four sample spot registers are loaded, COOPTR is updated to point at the last byte of the coordinate block, which contains the number of touch spots on the desired line. The RST 7.5 latch is cleared by a SIM instruction so that interruption can occur on the next transition into state S0. The processor registers are restored and interrupts are enabled. Finally, the GOAHD latch is set by writing to location 8500 and INTHND is exited.

Frame Processing

General

While sampling and storing proceeds in the foreground under the direction of INTHND, processing of sampled data takes place in the background. This foreground/background allocation allows utilization of the time during which the sample spot hardware is awaiting sampling of the next raster line.

The algorithm used to process a frame of data must be broken into three parts.

An initialization routine sets up any variations or pointers to be used. In particular, register pair BC is made to point to the start of the frame array. A spot processing routine applies the algorithm to the next element of the frame array. Parameters are adjusted so that the next element is ready to be processed. In particular, register pair BC is incremented to point at the next array element. A finalization routine performs any decision or housekeeping duties that remain.

Subsequent discussion will clarify the situation.

Operation

The macro LDPRO is used to perform sampling and processing of a frame. LDPRO specifies where in memory to construct the frame array and what algorithm to process it with. It does so by initializing SCRPTR to the desired start of the frame array and loading into locations PRINIT, PRSPOT, and PRFNL the addresses of the initialization, spot processing, and finalization routines. LDPRO then calls the routine LOADPR.

As shown in the flowchart of FIG. 19 LOADPR begins by initializing COOPTR to location COORD. The SMPSTT flag is set to 1 (busy) and INTHND is called to initiate the interrupt-driven sampling. LOADPR then invokes the initialization phase of the algorithm by executing the routine whose address is stored in PRINIT.

At this point an administration loop is entered to coordinate the sampling and processing. Interrupts are disabled while LOADPR checks to see if all data which has thus far been stored has been processed. This check consists of comparing the contents of register pair BC to the value in SCRPTR. Inequality means that there is still frame data available to process; interrupts are enabled, the next element is processed by the routine specified in PRSPOT, and the loop is restarted. Equality signifies that all available frame data has been processed. A check of SMPSTT is then made to see if more data is expected, i.e., more raster lines are to be sampled. If sampling is complete, the finalization routine in PRFNL is executed and LOADPR is exited. If sampling is not complete, interrupts are enabled and the loop is restarted.

Careful control of interrupts is exerted by LOADPR. During the administration loop it is necessary to disable interrupts while checking for processing completion. Otherwise, it is possible that while performing the check an interrupt will occur after it has been determined that all available data has been processed but before SMPSTT has been checked for completion. If, for example, an interrupt occurs causing loading of data from the last desired scan line, SMPSTT will be set to 0 by INTHND and LOADPR will exit without processing the last line. By disabling interrupts for the duration of the completion check, the foreground sampling process is frozen and a correct evaluation can be made.

In the flowchart, the path between the consecutive enable and disable interrupt steps is actually a JMP instruction. This provides the necessary one instruction delay after the enable interrupt instruction so that program flow can be interrupted at this point.

Touch Detect Algorithm

The routine TCHDT performs all of the operations required to detect and locate a touch. The application program sets up the coordinate block structure, draws the display pattern on the screen, and calls TCHDT. TCHDT returns with the position of the touch.

In addition to the coordinate block structure, TCHDT uses several arrays and lookup tables. FRAME0 and FRAME1 are each arrays of up to 132 bytes and are used to store frame data. FTBL, GTBL, and HTBL are lookup tables whose purposes will be described later.

Reference Frame Computing

The reference frame is computed first. Routine CLFO zeroes the array FRAME0. Then a summation loop is repeated four times: a data frame is read into FRAME1; FRAME0; and FRAME1 are elementally summed and stored in FRAME0. (The loop consists of the LDPRO macro and utilizes the algorithm components INITAV, SPOTAV, and FNLAV.) Because the A/D converter output is six bits wide this summation can be performed without overflow of the eight bit array element. Routine DVDF4 then divides each element of FRAME0 by four resulting in the average of the four frames read.

Routine FADJ adjusts the values of the FRAME0 elements so that they represent the threshold values for a touch decision. Adjustment is made according to the rule FRAME0(I) = F(FRAME0(I)) + G(X) + H(Y) . F is the function defined in lookup table FTBL. It provides the capability of abritrary transfer characteristic for the data. G is the function defined by lookup table GTBL, where X is the horizontal coordinate of the touch spot location corresponding to the element FRAME0(I). Similarly, H is defined by HTBL and Y is the vertical coordinate of the corresponding touch spot. GRBL and HTBL compensate for variations in sensitivity due to geometry.

With the uniform optical response provided by the photodiode positioning configuration that was finally adopted, it was found that the flexibility provided by the tables is no longer necessary. FTBL is filled with an identity lookup, HTBL is filled with zero, and GTBL is filled with four. The net result is that the adjustment to FRAME0 consists of increasing each element by four. The implication is that, for a given touch spot, the threshold for a touch decision is four A/D increments above its untouched value.

Touch Detection

Once the reference frame has been computed, each successive video frame is sampled, stored in FRAME1, and processed by the algorithm consisting of INIT1, SPOT1, and FNL1. Elemental comparison is made between FRAME0 and FRAME1. An element of FRAME1 equal to or exceeding the corresponding element of FRAME0 becomes a candidate for a touch, setting the flag HTDTCT and storing the element number in location TOUCH. (In the event that several elements of FRAME1 increase over the corresponding elements of FRAME0, the element with the largest increase becomes the candidate.) A decision that a touch has occurred is made when three successively sampled video frames yield the same candidate for a touch. TCHDT exits with location TOUCH containing the number of the element of FRAME0 that corresponds to the spot location touched.

Break Detection

BRKDT is a routine that allows detection of a break (i.e., removal of touch) after a touch has been detected. The reference frame FRAME0 that was utilized to detect the touch is still used as is the algorithm consisting of INIT1, SPOT1, and FNL1. Decision that a break has occurred is made when two successively sampled video frame yield no touch candidate, i.e., the flag HTDTCT is clear for two successive frames.

Conclusion

While the technique shown is illustrated in one embodiment it is recognized that those skilled in the art may use the same technique for other embodiments as for example, any self-illuminating time sequenced display. This could include fluorescent and LED displays, as well as electronic light generation.

It is also recognized that the sensitivity of the entire circuit can be coupled with the brightness of the CRT screen, either by a mechanical linkage or by using an automatic gain control of the preprocessor controlled by the intensity of the sampled data. The mechanical linkage would gong the gain adjustment of the CRT brightness control to the gain potentiometer of the preamp.

We claim:

1. An arrangement for detecting the exact time of a non-cyclic signal change within a portion of an otherwise cyclically repeating time varying signal having constantly changing signal levels within each cycle, said arrangement comprising.

means for establishing a data base of cyclic signal values, means for dividing each cycle of said time varying signal into incremental parts, each said part representative of a specific time of said varying signal, means for sampling said varying signal at each said specific time to obtain a signal value representative of said cyclic signal at each said incremental part, means for averaging like incremental value samples from several cycles of said cyclic signal to provide reference values, one said reference value for each said established incremental time, means for comparing sample values from subsequent cycles for each incremental part against said like averaged reference value; and means for providing a unique output only when there is a detected difference between said compared values.

2. The invention set forth in claim 1 wherein said unique output includes means for determining the incremental time when said difference is detected.

3. The invention set forth in claim 2 wherein said determining means includes means for performing comparisons during subsequent cycles to determine detected compared value changes, and means for inhibiting said unique output until the same incremental part is determined changed during at least two of said cycles.

4. A system for determining the position of a touch with respect to a touch sensitive screen where a periodically repeating illumination source sweeps across said screen and where an output signal, generated as a result of said illumination source, is modified during the instant of time the source generates light under a touched portion of said screen, said system comprises means for dividing said output signal into parts, each part corresponding to the time when said source illuminates certain portions of said screen, means for obtaining samples of said output signal at certain selected parts, means for averaging said obtained samples with subsequently obtained samples at like selected parts, means for storing said averaged samples, means for comparing subsequently obtained sample values at said certain selected parts with like stored averaged values to determine which of said stored values is one corresponding to a part where said output signal has been modified, and means controlled by said comparing means for providing a positional determination corresponding to the position of said touch.

5. The invention set forth in claim 4 further comprising means for establishing a temporary list of positions on said screen where possible touches could occur, and means for generating said certain selected parts from said established list.

6. The invention set forth in claim 4 further comprising means for changing the gain of said obtained samples, and means for coupling said gain changing means to the brightness of said image on said CRT.

7. The invention set forth in claim 4 further comprising means for comparing the magnitude of said obtained samples against a reference, and means responsive to said comparing means for adjusting the gain of said output signal.

8. A system for use in combination with the screen of a CRT, said CRT operable for generating light images on the screen thereof, said light images occurring as a result of a horizontal and vertical scan of an electron beam directed against said screen, said system arranged to determine the position of a touch of an image generated on said screen, said system including a sheet of material having inner and outer parallel surfaces through which light generated at said CRT screen will pass with a refraction angle $\theta 1$ at said inner surface next to said CRT screen and with a refraction angle $\theta 2$ at said outer surface, light utilization means communicating with at least one edge of said device and operable for providing an output representative of the magnitude of light which impinges on said light utilization means, means for positioning said light utilization means such that said impinging light comes substantially from between said surfaces of said device and such that when said refraction angle $\theta 2$ is changed to refraction angle $\theta 3$ said light utilization means output reflects said angle change, said refraction angle $\theta 3$ being below the critical angle for total internal reflection to occur, means for dividing said light utilization output into parts, each part corresponding to the time when said beam passes certain portions of said screen, means for obtaining samples of said light utilization output at certain selected parts, means for averaging said obtained samples with subsequently obtained samples at like selected parts, means for storing said averaged samples, and means for comparing subsequently obtained sample values at said certain selected parts with like stored averaged values to determine which of said stored values is one corresponding to a part where said corresponding light utilization output reflects said angle change.

9. The invention set forth in claim 8 further comprising
means controlled by said comparing means for providing a determination of the horizontal and vertical position of said touch.

* * * * *